P. H. MARTIN.
CUSHION WHEEL.
APPLICATION FILED MAR. 12, 1913.
1,090,735.
Patented Mar. 17, 1914.
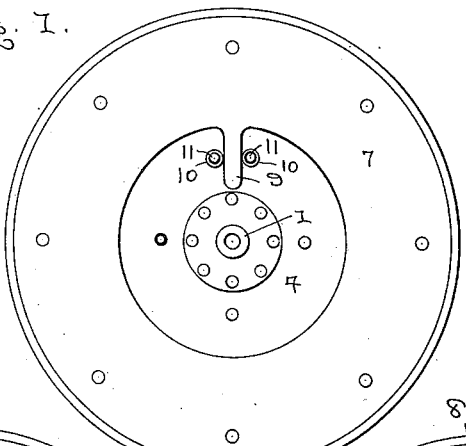
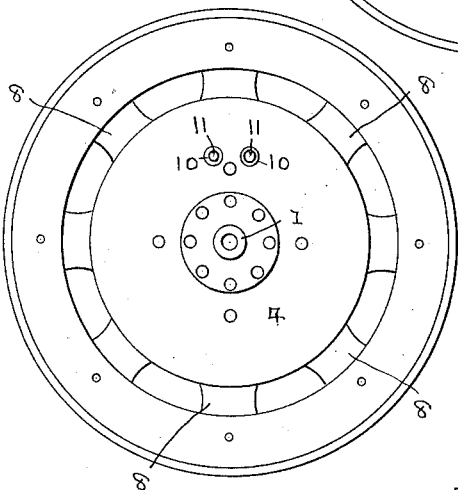
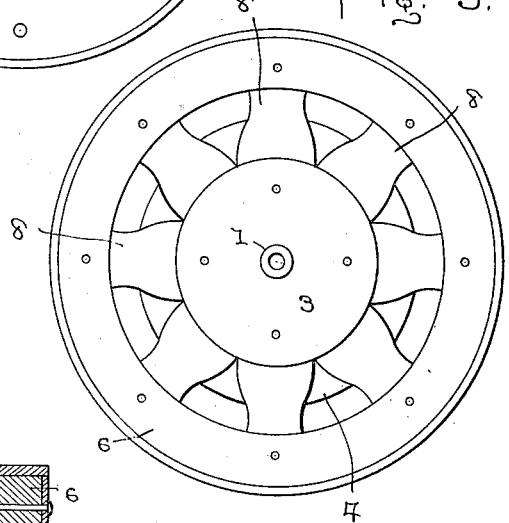
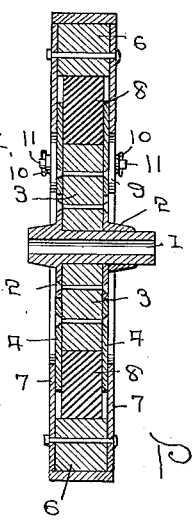
Witnesses
Geo. W. Riley
M. Newcomb
Inventor
P. H. Martin
By W. J. FitzGerald & Co.
Attorney

UNITED STATES PATENT OFFICE.

PERLEY H. MARTIN, OF VERSHIRE, VERMONT.

CUSHION-WHEEL.

1,090,735.

Specification of Letters Patent.

Patented Mar. 17, 1914.

Application filed March 12, 1913. Serial No. 753,874.

*To all whom it may concern:*

Be it known that I, PERLEY H. MARTIN, a citizen of the United States, residing at Vershire, in the county of Orange and State of Vermont, have invented certain new and useful Improvements in Cushion-Wheels; and I do hereby declare the following to be a full, clear, and exact description of the invention, such as will enable others skilled in the art to which it appertains to make and use the same.

My invention relates to cushion wheels, and one of the objects, among others, is to provide a wheel embodying the desirable characteristics of the pneumatic tread and flat unyielding tread wheels.

Other objects and advantages will be hereinafter pointed out in the specification and claims.

In the accompanying drawings, Figure 1 represents a view in side elevation of the complete wheel. Fig. 2 represents a side elevation of the wheel after the removal of the flange carried by the rim. Fig. 3 represents a side elevation of the wheel with two of the guide flanges removed, and, Fig. 4 represents a vertical sectional view through Fig. 1.

Referring to the drawings, 1 denotes a spindle adapted for rotatable engagement over an axle (not shown), and is provided with outwardly directed flanges 2, for securely clamping the hub block 3 in operable position. The flanges 2 of the spindle 1 terminate inwardly of the peripheral edge of the hub 3, and to the exposed portions of the hub block 3 are secured radially extending and spaced guard flanges 4. A rim 6 of substantially non-yielding material of sufficient size to permit of the insertion of the hub block 3, carrying the guard flanges 4, is disposed about said guard flanges and in spaced relation thereto. The opposing faces of the rim 6 are provided with inwardly directed guard flanges 7, telescopically engaging the guard flanges 4. Entirely incased within the guard flanges 4 and 5, and the hub block 3 and rim 6, is arranged a plurality of elastic spokes 8. The spokes are preferably formed from rubber or some light material having elastic qualities, and are formed of such size at their inner ends as to occupy the entire peripheral surface of the hub block 3.

The outer ends of the spokes are preferably reduced somewhat in size so as to increase the resiliency between the hub and rim. Relative rotation of the inner and outer parts of the wheel is prevented by means of the inwardly directed tongues 9, carried by the guard flanges 7 and engaging between the collars 10, rotatably mounted over studs 11 fixed to the flanges 4. The rim 6 is shown provided with a metallic tire 12, but as will be understood, any desired tire may be employed. The spokes 8 are preferably loosely fitted within the wheel in order that they may be easily and quickly replaced when worn out.

What I claim is:—

1. A resilient wheel providing a spindle, a hub secured thereon, circular inner guards secured on said hub on both sides thereof, and extending beyond the periphery of the hub, a rim, resilient spokes frictionally engaging said hub and rim, outer annular guard flanges secured on said rim and telescopically engaging said inner guards on the outer sides thereof, depending fingers on said outer guards, and a pair of rotatable collars secured to the inner guards, said collars engaging said fingers to prevent creeping in the wheel parts.

2. A resilient wheel providing a spindle, a hub secured thereon, plane circular inner guards on said hub on both sides thereof, and extending beyond the periphery of the hub, a rim, solid resilient separate spokes wider at their inner than at their outer ends, the inner ends of said spokes bearing directly against, but unattached to, said hub, the sides of the spokes at their inner ends lying directly against, but unattached to, said inner guard flanges, the inner ends of said spokes occupying collectively the periphery of said hub, and abutting against each other, outer annular guard flanges secured on said rim and telescopically and slidably engaging said inner guards on the outer sides thereof, the outer ends of said spokes bearing against, but unattached to, said rim, said outer ends being spaced from each other, and co-acting means on said outer and inner guard flanges to prevent creeping of the wheel parts.

3. A resilient wheel providing a spindle, a hub secured thereon, circular inner guards secured on said hub on both sides thereof and extending beyond the periphery of the hub, a rim, resilient spokes frictionally engaging said hub and rim, outer circular guard flanges secured on said rim and telescopically engaging said inner guards on the outer sides thereof, depending fingers on said outer guards, and means on said inner guards for frictionally engaging said fingers to prevent creeping of the wheel parts.

4. A resilient wheel providing a spindle, a hub secured thereon, circular inner guards secured on said hub on both sides thereof and extending beyond the periphery of the hub, a rim, resilient spokes frictionally engaging said hub and rim, outer circular guard flanges secured on said rim and telescopically engaging said inner guards on the outer sides thereof, a pair of rotatable collars secured to each of the inner guards, and means on said outer guard flanges for engaging said rotatable collars to prevent creeping of the wheel parts.

In testimony whereof I have signed my name to this specification in the presence of two subscribing witnesses.

PERLEY H. MARTIN.

Witnesses:
B. F. FULLER,
C. A. FULLER.

Copies of this patent may be obtained for five cents each, by addressing the "Commissioner of Patents, Washington, D. C."